UNITED STATES PATENT OFFICE.

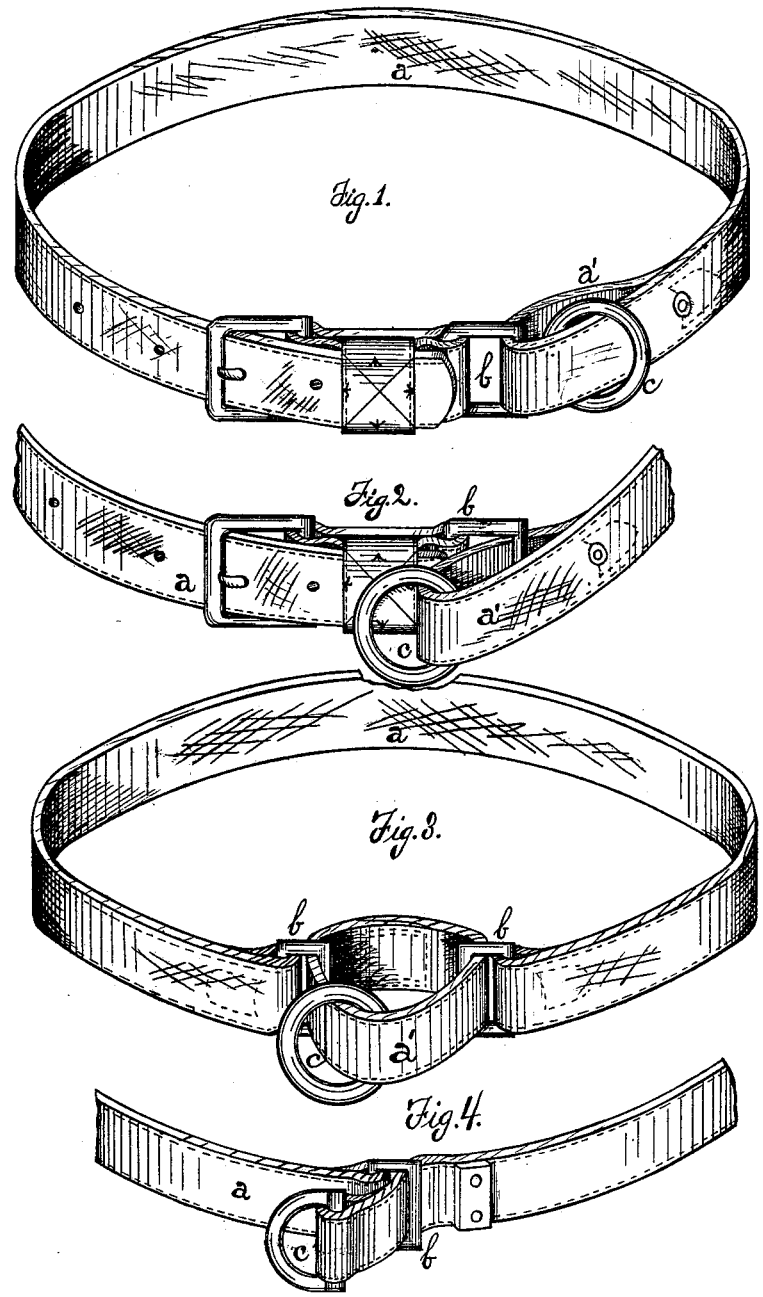

NORMAN ELMORE, OF GRANBY, CONNECTICUT.

IMPROVEMENT IN DOG-COLLARS.

Specification forming part of Letters Patent No. 188,043, dated March 6, 1877; application filed January 19, 1877.

*To all whom it may concern:*

Be it known that I, NORMAN ELMORE, of Granby, in the county of Hartford and State of Connecticut, have invented certain new and useful Improvements pertaining to a Dog-Collar, of which the following is a specification, reference being had to the accompanying drawings, where—

Figure 1 and 2 are perspective views of the same collar in different adjustments. Figs. 3 and 4 are views of modifications.

The object of the invention is the production of a dog-collar which shall lie easily on the neck of the dog when he does not pull on his chain, but which shall, within limits, contract in size, and closely embrace the dog's neck when he attempts to pull on his chain or cord. It is made of leather or other suitable material.

It is customary to keep hunting-dogs chained, as a rule, and it is necessary to chain up many other dogs. It not infrequently happens that the dog's neck and head are so nearly the same in size that a common collar, not fitting tight enough to choke the dog, can be pulled off over the dog's head by a little effort on his part. My simple, but exceedingly useful, invention completely cures this difficulty.

The band $a$—bearing, by preference, the take-up device shown, for fitting the collar approximately to the dog's neck—bears at one end the metallic loop $b$, also fitting loosely in the looped or doubled end $a'$ of the band $a$.

The chain or cord may be fastened directly into the looped end $a'$; but I prefer that this be done through the medium of the ring $c$.

The collar is to be so adjusted in length to the dog's neck that, when in the position shown in Fig. 1, it lies or fits snugly but easily on the dog's neck. The moment the dog pulls on his chain the position of the parts changes to that shown in Fig. 2, causing the collar to contract rather closely upon the dog's neck, but not enough to choke him, and effectually prevents the collar from slipping off over the dog's head.

It is essential that the loop $a'$ be limited in length, that the dog be not injured by a sudden jump, which might otherwise act with disastrous effect on the dog's throat.

The operation of the modifications shown in Figs. 3 and 4 is apparent at a glance, both having the feature of limited contraction, which I consider to be the essential principle of the invention.

I claim as my invention—

A dog-collar provided with the looped end $a'$ and loop $b$, by which the collar is made adjustable, substantially as shown and described.

NORMAN ELMORE.

Witnesses:
  WM. E. SIMONDS,
  ROBT. F. GAYLORD.